A. HINES.
TRAVELING REAPER AND THRESHER.
APPLICATION FILED MAR. 6, 1909.

989,151.

Patented Apr. 11, 1911.

Witnesses
Howard N. Orr.
C. Bradway.

Alfred Hines, Inventor,
By E. G. Siggers
Attorney

UNITED STATES PATENT OFFICE.

ALFRED HINES, OF WASCO, OREGON.

TRAVELING REAPER AND THRESHER.

989,151.  Specification of Letters Patent.  Patented Apr. 11, 1911.

Application filed March 6, 1909. Serial No. 481,657.

*To all whom it may concern:*

Be it known that I, ALFRED HINES, a citizen of the United States, residing at Wasco, in the county of Sherman and State of Oregon, have invented a new and useful Traveling Reaper and Thresher, of which the following is a specification.

This invention relates to traveling reapers and threshers, and the primary object of the invention is to provide a harvester of this type equipped with automatically-operated leveling means whereby the thresher will be maintained level, irrespective of the changes in contour of the field over which the machine is traveling.

Another object of the invention is the provision of a harvesting machine of this type which is of durable and substantial construction, thoroughly reliable and efficient in use, and so designed as to require a minimum tractive power.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Fig. 2 is a side view thereof.

Similar reference characters are employed to designate corresponding parts throughout the views.

Referring to the drawing, A designates the body frame of the machine which is a skeleton framework of angle iron composed of forwardly-converging side bars 1 connected by suitably-arranged cross bars 2, and at the rear of the frame is a lateral extension composed of bars 3 which converge in an outward direction and are rigidly connected at their outer ends 4 where a bearing 5 is arranged for the stub axle 6 of the supporting wheel 7. The rear end of the body frame A is supported on a wheel 8, while the front end of the frame is mounted on a fore-carriage 9 having a horizontal axle 10 on which are arranged the wheels 11 at opposite sides of the carriage, the carriage being pivoted to the front end of the frame A by a king bolt 12. The wheels, being at opposite sides of the carriage, will not slide or cut into the ground when turning the harvester to one side and will not tend to bend or break the axle or the main frame on inclined ground. It will also be noted that the king bolt is in the same longitudinal line with the pivots of the thresher frame so that the front end of the main frame will be firmly supported, but will be free to turn to either side and will not interfere in any way with the tilting or leveling of the thresher frame. Attached to this fore-carriage is a tongue 13 equipped with a suitable draft device 14 for attaching draft animals to the machine, although it is to be understood that a traction engine may be used for driving the machine, instead of animals. The outer end of the lateral extension is braced from the middle portion of the main frame by a bar 15 arranged slightly at an angle to the perpendicular to the direction of travel, and this bar constitutes an axle on which the reaper frame B is tiltably mounted, there being bearings 16 on the frame B for supporting the latter on the axle 15. This frame B is provided with a rearwardly-extending arm or lever in the form of a skeleton framework 17, and on the rear extremity of the arm is a weight 18 that counterbalances the weight of the reaping mechanism. On the forward part of the frame is a horizontally-extending member or arm 19 shown in Fig. 1, which extends toward the front portion of the main frame A and is connected with the lower end of a vertically-disposed link 20 which extends upwardly at one side of the driver's box 21 on the front end of the frame, which link is connected with an operating lever 22 fulcrumed at 23 and equipped with a latch device 24 coöperating with the toothed segment 25 whereby the lever can be locked in any position. By means of this lever, the driver can change the position of the sickle knife according to the height of the grain. That is to say, when the lever 22, Fig. 2, is moved forwardly, the link 20 will be raised and consequently the reaper-carrying frame will be tilted on its axle 15 to raise the sickle, while a reverse movement of the lever will cause the sickle to be lowered.

Figure 1:
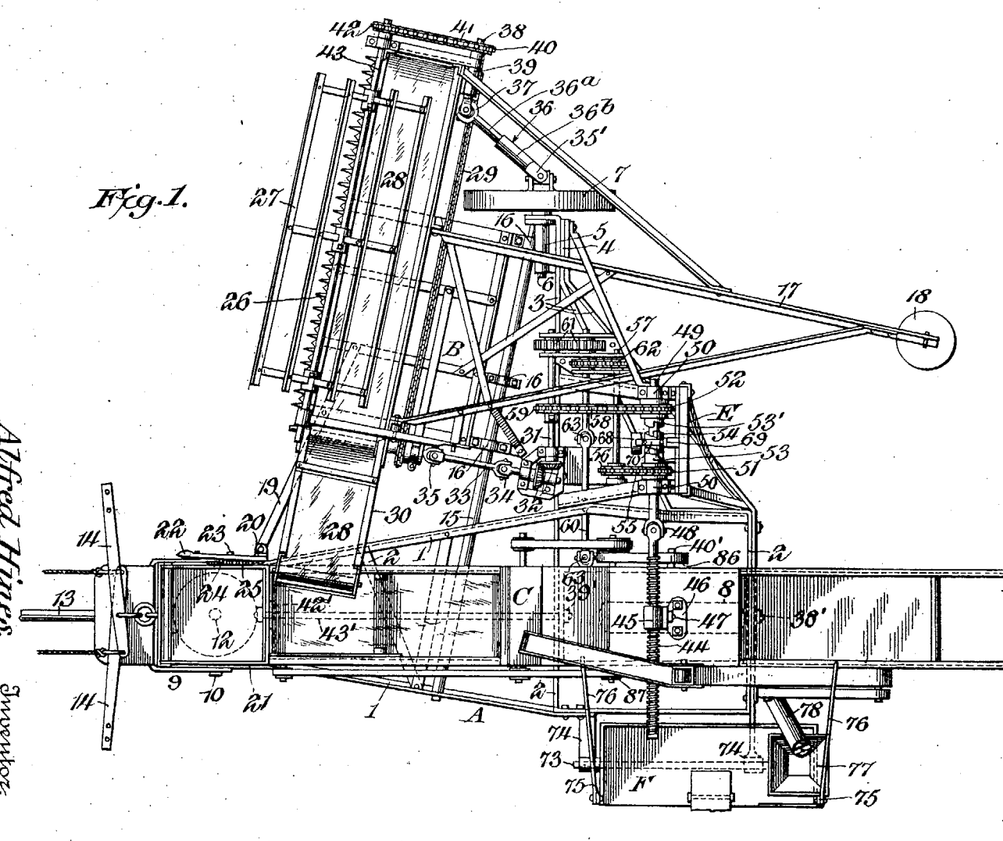
Figure 1 is a plan view of the harvester.

Mounted on the frame B is the usual reciprocatory sickle 26 over which is arranged a rotary reel 27 for throwing the heads of the grain rearwardly upon an endless belt or draper 28 extending parallel with the sickle knife and driven by a sprocket chain mechanism 29 to convey the heads to the thresher or separator C, there being an elevator 30 in which the draper 28 operates to raise the separated grain into the mouth of the separator, as shown in Fig. 1. The sickle bar 26 and sprocket chain 29 of the draper 28 are operated from a shaft 31 on the lateral extension of the main frame, Fig. 1, the said shaft being connected by miter gears 32 with the forwardly-extending shaft 33 composed of sections connected by universal joints 34 and 35 which provide for the vertical adjustment of the reaper mechanism. The reel of the reaper mechanism is driven from the traction wheel 7 that is connected by a universal joint 35 with an extensible shaft 36 which is connected by a universal joint 37 with a shaft 38 mounted in a bearing 39 on the reaper frame, and on this shaft 38 is a sprocket wheel 40 over which passes a sprocket chain 41 that meshes with the sprocket wheel 42 on the shaft 43 of the reel 27, so that as long as the machine is traveling, the reel will be operated. The extensible rod or shaft 36 is composed of two sections $36^a$ and $36^b$ which telescope but are prevented from having relative rotation so as to provide for the change in the distance between the driving wheel 7 and the reaper frame as the latter is raised and lowered.

The separator or thresher C extends longitudinally of the frame A and is located centrally over the wheel 8. The separator is mounted in such a manner with respect to the main frame that it can be maintained in a level position irrespective of the changing positions of the main frame, which will follow the contour of the field over which the machine is traveling. For this purpose, the rear end of the separator is mounted on a supplemental frame D, Figs. 3, 4, and 5, by means of short posts 37', and this frame is pivotally connected at its front and rear ends to the main frame A at the points 38' and 39'. This supplemental frame D forms a housing for the wheel 8 and the axle 40' thereof is mounted on bearings 41' on the supplemental frame. The side angle irons $42^a$ of the separator are carried across the front end of the separator C to provide a depending member 42' which is pivotally connected with a horizontally-extending rod 43' connected at its front end with the front of the frame A and at its rear end with the front of the supplemental frame, so that the front part of the main frame will also take the strain produced by the separator. As the pivotal points 38', 39' and 42' are located coincident with the line of travel, it will be evident that the main frame A of the machine can rock to accommodate itself to the sloping ground, while the separator can be maintained in a level position.

The separator C is adapted to be maintained in a level position by automatically-operated mechanism which depends for its operation upon the relative changes in position of the main frame. This leveling mechanism comprises a screw 44 extending transversely to the separator and disposed over the top thereof, and on the top of the separator is a nut or threaded member 45 in which the screw engages, the said member being connected to a bracket 46 on the top of the separator by a pivot 47 disposed with its axis longitudinal to the separator. One end of the leveling screw is connected by a universal joint 48 with a shaft 49 mounted in bearings 50 on an upstanding frame E carried by the lateral extension of the main frame and disposed at one side of the separator. On this shaft 49 are loosely mounted sprocket wheels 51 and 52 which have the inner faces of their hubs formed into clutch elements 53 and 53', and between these elements is a sleeve 54 fixed to the shaft 49 and arranged to constitute a clutch element common to both of the elements 53 and 53', and adapted to automatically engage one or the other, according to the direction of rotation to be imparted to the leveling screw for maintaining the thresher or separator level. The sprocket wheel 51 is driven by a sprocket chain 55 which passes around a sprocket wheel 56 on a shaft 57 at the base of the upright frame E. The sprocket wheel 52 is rotated in reverse direction by a sprocket chain 58 which passes around a sprocket wheel 59 on the shaft 31. Intermediate the shafts 31 and 57 is a main driving shaft 60 which is connected by gears 61 with the shaft 31 and by a sprocket chain device 62 with the shaft 57. This shaft 60 is composed of sections connected by universal joints 63, and it is adapted to receive rotation from the wheel 8 through a large sprocket 64 on the latter driving a sprocket chain 65 that meshes with the sprocket 66 on the shaft 60. The universal joints in the shaft 60 permit the main frame to tilt with respect to the secondary frame D in which the wheel 8 is mounted, it being understood that the wheel 8 maintains a vertical position so that the separator will always be level. The section of the shaft 60 that carries the gear 61 and the sprocket of the device 62, is slidably mounted in bearings on the frame extension and is also slidable through the said gear and sprocket that are splined on the shaft, so that the latter will not interfere with the relative tilting of the main or auxiliary frames of the machine. It will thus be seen that as long as the machine is traveling, the sprocket chains 55 and 58 will continuously operate so as to throw into operation the leveling screw as the contour of the field over which the separator is traveling changes. When the machine is on a level surface, the parts will be in the position shown in Fig. 3, and as soon as a sloping piece of ground is encountered, the main frame will tilt and thereby throw the upstanding frame E toward or away from the separator, and as the shaft 49 is slidable in its bearings 50, a relative longitudinal movement of the shaft 49 with respect to the frame E will be produced so as to throw in one clutch or the other. As soon as the clutch is thrown in, the screw 44 will be turned to cause the separator to be maintained in a level position.

Figure 3:
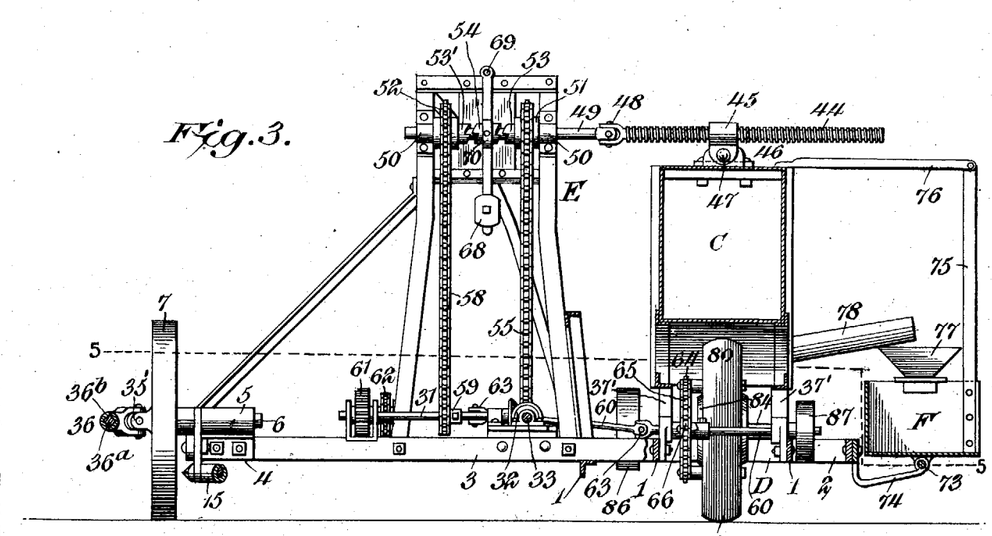
Fig. 3 is a transverse section of the machine taken in the plane of the leveling mechanism and showing the machine on a level surface.
Figure 4:
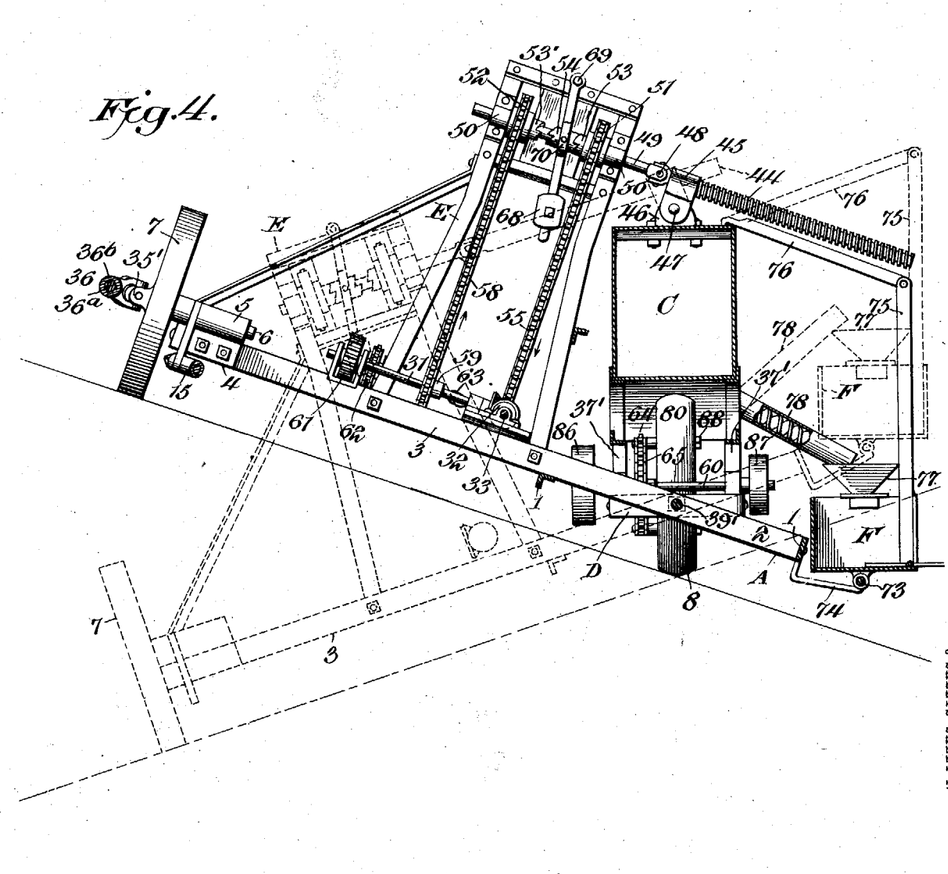
Fig. 4 is a similar view showing the machine by full and dotted lines on oppositely-sloping surfaces.
Figure 8:
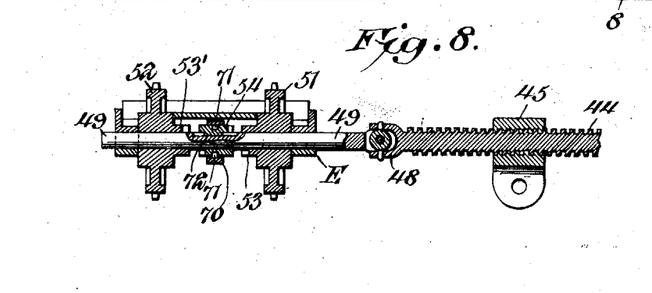
Fig. 8 is a detail sectional view of the reversing device for the leveling screw.

More specifically, when the machine is traveling over a sloping field, as indicated by the full line in Fig. 4, the clutch element 54 will engage the clutch member 53 and cause the screw to rotate in a direction to draw the separator toward the upright frame E, and as soon as the separator passes beyond a vertical position in a direction toward the upright frame, it would move the shaft 49 longitudinally so as to disengage the clutch element 54 from the clutch member 53 and thus throw the screw out of operation so as to maintain the separator in an approximately level position. As soon as the main frame lowers by the slope diminishing, the separator will lean more and more toward the upright frame E and cause the shaft 49 to move to such an extent as to engage the clutch member 54 with the clutch member 53' so that the screw 49 will be rotated in the opposite direction to that previously considered, to throw the separator away from the frame E until the former reaches a position slightly beyond the vertical so as to thereby exert a pull on the shaft 49 in a direction to disengage the clutch elements. It will thus be seen that no matter in which direction the main frame of the machine tilts with respect to the separator, the latter will be automatically thrown to an approximately level position. to assist in the movement of the double clutch member 54, a pendulum 68 fulcrumed at its upper end 69 at the top of the upstanding frame E, is provided. This pendulum has a collar 70 which, as shown in Figs. 3 and 8, embraces the double clutch member 54, and the collar is provided with inwardly-extending lugs 71 which engage in an annular groove in the clutch member 54, the latter being feathered to the shaft 49 as indicated at 72, Fig. 8.

Figures 5, 6:
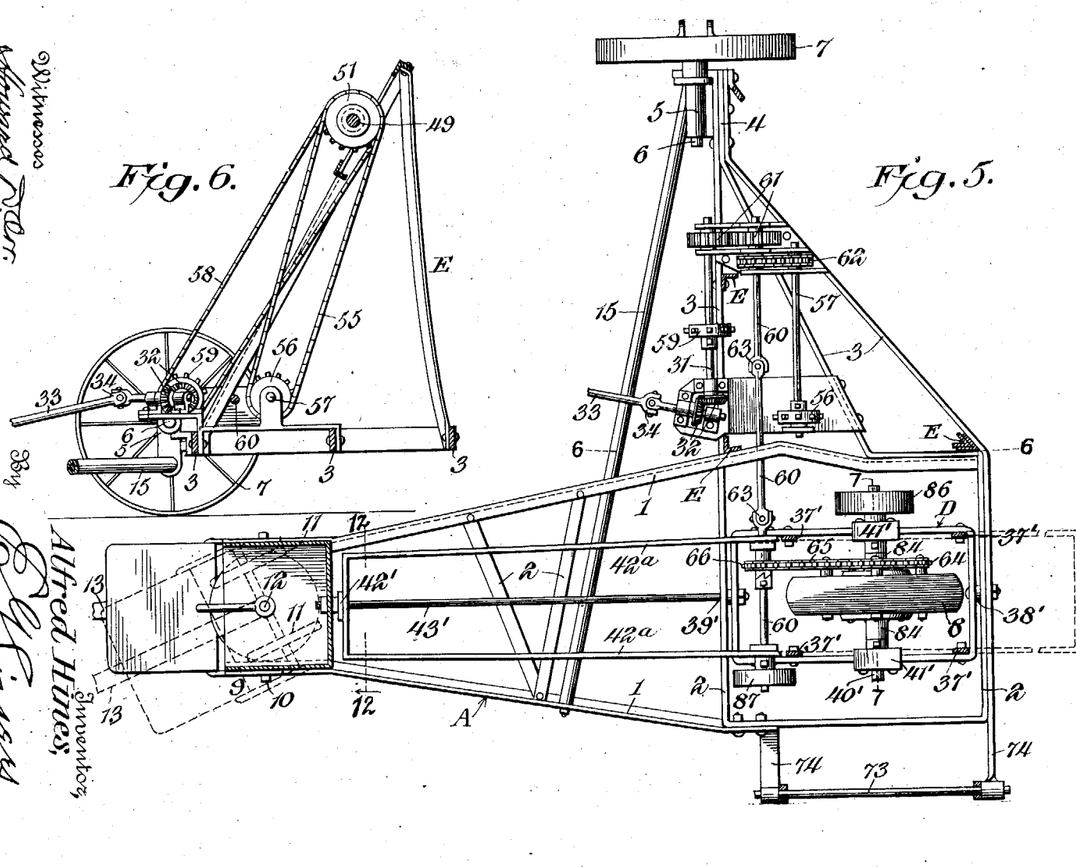
Fig. 5 is a horizontal sectional view taken on line 5—5, Fig. 3.
Fig. 6 is a vertical sectional view on line 6—6, Fig. 5.
Figure 6:
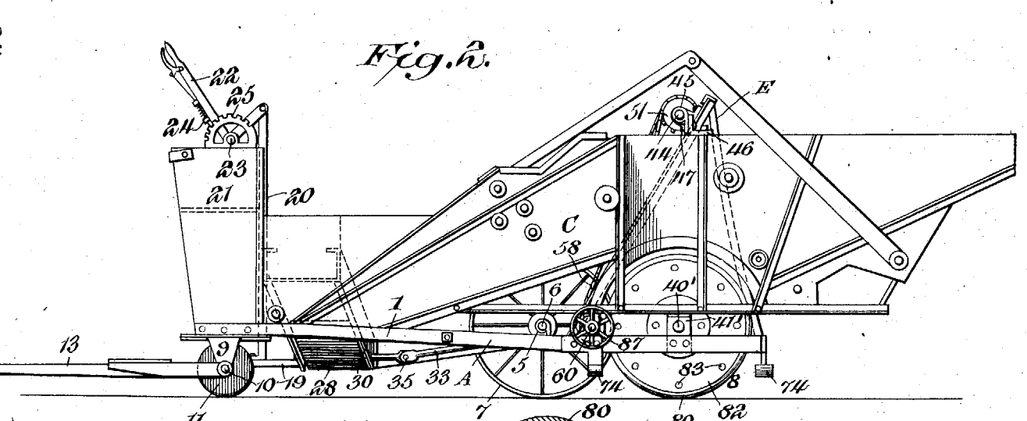

The construction of the separator or thresher C will not be here described, as the same constitutes the subject-matter of a copending application. There are certain features of the separator, however, which are especially designed with reference to the leveling apparatus. At one side of the separator is a platform F on which the attendants attending to the filling and sacking of the grain are intended to stand. This platform is mounted to swing on a horizontal shaft 73 extending under the platform and mounted in brackets 74, as shown in Figs. 4 and 5. This platform is maintained level with the separator by being connected therewith, as for instance, by upright posts 75 secured to the outer corners of the platform, and the posts have their upper ends connected by links 76 with the top of the separator. The brackets 74 are rigidly secured to the main frame A, so that as the latter tilts with respect to the separator, the platform will rise and fall, but the floor thereof will always maintain an approximately horizontal position. On the platform is supported a sack-filling hopper 77 and leading from the separator or thresher to this hopper is a chute or spout 78 which is provided with a screw or other conveyer for conducting the grain therethrough, especially when the spout is raised, as in the dotted line position, Fig. 4, the spout being loosely connected with the separator so as to change its position as the main frame tilts with the changing contour of the field over which the machine travels.

Figure 7:
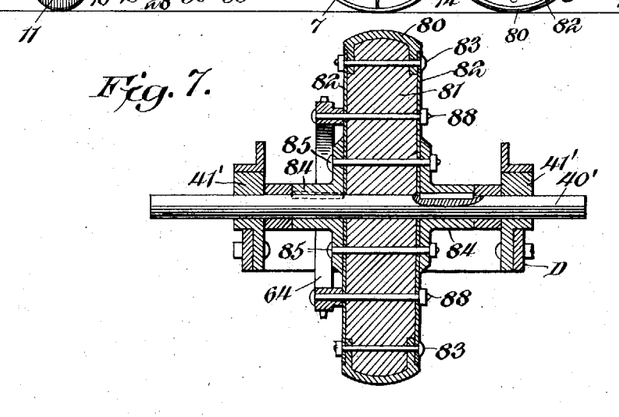
Fig. 7 is a transverse section on line 7—7, Fig. 5, taken through the traction wheel of the engine.

The wheel 8 sustains the greater part of the weight of the machine, and furthermore, it constitutes the driver for practically all of the machine except the reaper reel. This wheel also serves as a pivot on which the separator is adapted to tilt in the leveling operation. Therefore, the wheel is of special construction, and, as shown in Fig. 7, the wheel is provided with a rim 80 which is convex on its outer surface and this rim is secured to a solid body 81 of wood or other material having metal facing plates 82, the parts being secured together by bolts 83. The shaft 40' passes through the wheel and the latter is secured to the shaft by hub members 84 that are fastened to the wheel by bolts 85. One end of the shaft is equipped with a driving pulley 86, as shown in Fig. 5, which serves to drive certain of the parts of the thresher. On the portion of the shaft 60 mounted on the supplemental frame D is a pulley 87, Fig. 5, which serves also to drive parts of the thresher. The sprocket 64 for driving the shaft 60 is fastened to the wheel 8 by bolts 88, as shown in Fig. 7.

Figure 9:
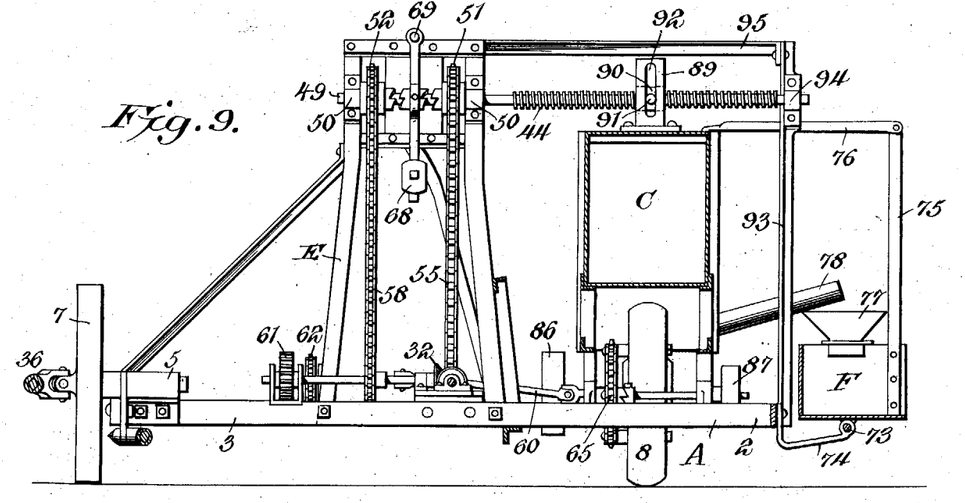
Fig. 9 is a sectional view of the machine showing a modified form of leveling device.
Figure 10:
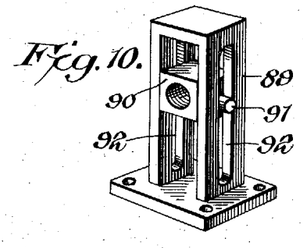
Fig. 10 is a perspective view of part of the modified construction.
Figure 11:
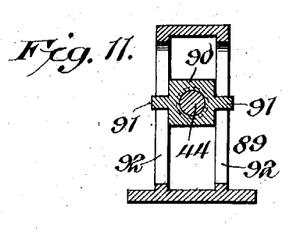
Fig. 11 is a vertical section of Fig. 10.
Figure 12:
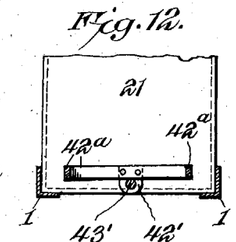
Fig. 12 is a section on the line 12—12 of Fig. 5.

The modification shown in Figs. 9 to 11, inclusive, relates especially to the manner of operatively connecting the leveling screw 44 with the thresher. On the top of the thresher is an upstanding guide 89 in which is mounted a vertically-movable nut 90 provided with oppositely-disposed gudgeons 91 slidably mounted in vertical slots 92 of the guide for permitting the nut to turn with the changing position of the screw 44 that is threaded in the nut, the screw being rigidly connected with the shaft 49 and having one end mounted in a bearing 94 on the upright 93 rigidly secured to the main frame and braced at its upper end from the frame E by the horizontal brace 95. It is obvious that the body frame and separator can have free relative tilting movement without any binding of the screw in the nut, since the latter is free to rise or fall in the guide 89.

The leveling mechanism herein described, besides serving to maintain the separator or thresher in an approximately vertical position, has the further important function of constantly rocking the thresher back and forth within narrow limits, say four inches, more or less, so as to materially assist in separating the grain by the threshing mechanism. By supporting the thresher on a single wheel, as herein contemplated, the thresher is more or less top heavy and will freely oscillate back and forth in a lateral direction with respect to a vertical position, and the effect of this movement will be to keep the grain evenly distributed on the riddles of the thresher so as to efficiently separate the grain. If the thresher tilts to one side, one of the clutches will be closed to turn the leveling screw in a direction to right or return the separator, but the screw will not stop turning until the separator moves past the vertical position in the opposite direction until the said clutch is opened. The tendency of the separator or thresher will be to tilt farther from the vertical position by being top heavy so as to thereby close the other clutch and thus reverse the leveling screw, so that the thresher will be oppositely tilted. In this manner, the thresher will rock back and forth practically all the time the harvester is traveling.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, and desire to secure by Letters-Patent, is:—

1. In a traveling harvester, the combination of a wheel-supported reaper-carrying frame, a reaper thereon, a thresher-supporting frame lying entirely within the outline of the reaper-carrying frame and connected therewith for relative tilting movement, a thresher on said frame, a single supporting wheel in the thresher-supporting frame located under the thresher thereon and on which it tends to tilt, and automatic means for maintaining the thresher substantially level.

2. In a traveling harvester, the combination of a wheel-supported reaper-carrying frame, a reaper thereon, a thresher-supporting frame lying entirely within the outline of the reaper-carrying frame and pivoted centrally at its front and rear ends to the reaper-carrying frame, a thresher on said frame, a single supporting wheel in the thresher-supporting frame located under the thresher thereon and in line with the pivots of the frame and on which it tends to tilt, and automatic means for maintaining the thresher substantially level.

3. In a traveling harvester, the combination of a wheel-supported reaper-carrying frame, a reaper thereon, a thresher-supporting frame pivotally connected with the first frame in the line of draft, a thresher having one end supported on and rigidly connected with the latter frame and its other end supported on and pivotally connected to the first frame, a single wheel mounted on the second frame and located coincident with the pivotal connection between the frames, and automatically-operated means thrown into and out of operation by the relative changes in position of the frames for maintaining the thresher approximately level.

4. In a traveling thresher, the combination of a wheel-supported reaper-carrying frame, a reaper thereon, a supplemental frame pivotally mounted within the reaper-carrying frame, a thresher having its rear end rigidly secured to the supplemental frame and its front end pivotally connected with the reaper-carrying frame, and a mechanism between the thresher and the reaper-carrying frame and depending for its operation upon relative changes in position of the frames for maintaining the thresher substantially level.

5. In a traveling harvester, the combination of a body frame, wheels supporting the same, a reaping mechanism mounted on the frame, a wheel-supported secondary frame arranged within the body frame, pivotal connections between the frames located in the line of draft, a thresher arranged parallel with the line of draft and rigidly secured to the secondary frame and pivotally connected with the first frame, and a mechanism operating continuously during the travel of the harvester and adapted to automatically maintain the thresher substantially level.

6. In a traveling harvester, the combination of a body frame, wheels supporting the same, a reaping mechanism mounted on the frame, a supplemental frame connected with and disposed within the body frame and adapted to tilt on an axis parallel with the line of draft, a single wheel mounted on the supplemental frame and arranged to rotate in a plane coincident with the axis on which the said frame tilts, a thresher located on the supplemental frame centrally over the wheel, and an automatically-operated leveling means thrown into and out of operation by the tilting of the body frame with respect to the supplemental frame.

7. In a traveling harvester, the combination of a body frame, a reaper thereon, a thresher-supporting frame pivoted to the body frame in the line of draft, a thresher mounted rigidly on the thresher-supporting frame, a single supporting wheel arranged centrally under the thresher in line with the pivots connecting the two frames and mounted in the thresher-supporting frame, a fore-carriage pivoted to the body frame in advance of the thresher and carrying supporting wheels which are arranged on opposite sides of the said pivotal connection between the body frame and thresher-supporting frame, and means for maintaining the thresher substantially level.

8. In a traveling harvester, the combination of a body frame, a fore-carriage pivotally connected therewith, a reaping mechanism mounted on the frame, a supporting wheel disposed behind the fore-carriage and directly in the line of draft, means for connecting the said wheel with the body frame to permit the latter to tilt while the said wheel maintains a substantially vertical position, a separator supported in fixed relation to the said wheel and directly over the same, and an automatically-actuated leveling means depending for its operation upon relative changes in position of the said frame and wheel.

9. In a traveling harvester, the combination of a body frame, a reaper thereon, a thresher supporting frame pivoted to the body frame in the line of draft, a thresher rigidly secured to said frame and pivoted to the body frame in advance of said frame and in the line of draft, a single supporting wheel arranged in the thresher supporting frame in the line of draft, a wheel supporting the body frame at one side of the thresher supporting frame, a fore-carriage pivoted to the body frame in advance of the thresher and carrying supporting wheels at opposite sides, and means for maintaining the thresher substantially level.

10. In a traveling harvester, the combination of a body frame, a reaping mechanism carried thereby, a supplemental frame pivotally mounted on the body frame, a thresher rigidly secured to the supplemental frame and pivotally connected with the body frame and disposed in coöperative relation with the reaping mechanism, a single wheel secured to the supplemental frame, a leveling device for the thresher operated by the said wheel, and driving means for operating the thresher, reaping mechanism and leveling means from the said wheel.

11. In a traveling harvester, the combination of a wheel-supported frame, a thresher mounted thereon, a reaping mechanism on the frame, a leveling screw operatively connected with the thresher at the top in the longitudinal center line thereof, and automatically-operated means for turning the screw in either direction to maintain the thresher level independently of the change in position of the frame.

12. In a traveling harvester, the combination of a wheel-supported body, a reaping mechanism on the said body, a thresher mounted on the body for relative tilting movement, a leveling screw extending across the top of the thresher and operatively-connected therewith, and a mechanism deriving power from one of the wheels of the harvester and automatically thrown into and out of operation by the tilting of the body frame for leveling the thresher by the said screw.

13. In a traveling harvester, the combination of a supporting frame, a thresher pivotally mounted within the supporting frame, a reaping mechanism mounted on the supporting frame, a leveling screw extending transversely over the thresher, a threaded member secured on the thresher in the central longitudinal line thereof and engaging the screw, and an operating mechanism for rotating the screw in either direction to maintain the thresher substantially level.

14. In a traveling harvester, the combination of a wheel supported body frame, a supplemental frame, a single supporting wheel mounted in the supplemental frame, a reaping mechanism mounted on the body frame, means for connecting the frames together for relative tilting movement, a thresher rigidly secured to the supplemental frame and pivoted to the main frame in advance of the supplemental frame, a leveling screw operatively connected with the thresher, and a mechanism supported on the body frame and deriving power from the wheel in the supplemental frame for operating the screw.

15. In a traveling harvester, the combination of a supporting frame, a thresher pivotally mounted thereon, a reaping mechanism mounted on the supporting frame, a leveling screw extending transversely over the thresher and operatively connected therewith, a shaft rotatable in either direction and mounted on the body frame, a universal joint between the screw and shaft, and automatically-actuated means for rotating the shaft to maintain the thresher substantially level.

16. In a traveling harvester, the combination of a wheel supported body frame, a supplemental frame pivotally mounted therein, a reaping mechanism mounted on the body frame, a wheel supporting the supplemental frame, a thresher mounted on the supplemental frame in a position over the wheel and pivotally connected with and partly supported on the body frame, a leveling device for the thresher having parts mounted on the body frame, and driving means for the leveling device actuated by the wheel in the supplemental frame, said means being so constructed as to permit relative changes in position between the frames.

17. In a traveling harvester, the combination of a wheel-supported frame having an upstanding portion, a thresher pivotally mounted on the frame and disposed at one side of the said upstanding portion thereof, a screw extending transversely to and operatively connected with the thresher, a shaft mounted on the frame and connected with the screw, driving wheels loosely mounted on the shaft, clutches arranged to connect either wheel with the shaft by the longitudinal movement of the shaft, a pendulum device for assisting the operation of the clutches, a mechanism mounted on the frame for driving the said wheels in opposite directions, and a reaping mechanism mounted on the said frame in coöperative relation with the thresher.

18. In a traveling harvester, the combination of a main frame, a supplemental frame mounted within the main frame at the rear, means for pivotally connecting the rear end of the supplemental frame to the rear end of the main frame, means for pivotally connecting the front end of the supplemental frame to the front end of the main frame, a thresher mounted rigidly upon the supplemental frame and extending forwardly beyond the supplemental frame and pivotally connected to the front of the main frame, and a wheel housed in the supplemental frame and mounted thereon to rotate in a vertical plane parallel with the line of draft, the said wheel being arranged in direct alinement with the several pivotal points.

19. In a traveling harvester, the combination of a main frame, a supplemental frame mounted within the main frame at the rear, means for pivotally connecting the rear end of the supplemental frame to the rear end of the main frame, a thresher mounted rigidly upon the supplemental frame and extending forwardly beyond the supplemental frame, a horizontally extending longitudinally arranged rod located within the front part of the main frame in advance of the supplemental frame and pivotally connected at its rear end to the front end of the supplemental frame and pivotally connected at its front end to the front end of the main frame and the front portion of the thresher body, and a wheel housed in the supplemental frame and mounted thereon to rotate in a vertical plane parallel with the line of draft, the said wheel being arranged in direct alinement with the several pivotal points.

20. In a traveling harvester, the combination of a body frame, a thresher mounted thereon, a reaping mechanism mounted on the body frame in coöperative relation with the thresher, an automatically-operated leveling device for the thresher, and a platform associated with the thresher at the side thereof and movable vertically independently of the thresher as the body frame tilts, whereby the platform is maintained level by the said device.

21. In a traveling harvester, the combination of a wheel-supported body frame, a thresher mounted thereon, a reaping mechanism mounted on the body frame in coöperative relation to the thresher, a sacker's platform mounted to automatically rise and fall at one side of the thresher as the said body frame tilts with respect to the thresher, the said sacker's platform being supported by the body frame, and an automatically-operated leveling device common to the thresher and the platform.

22. In a traveling harvester, the combination of a wheel-supported body frame, a reaper carried by the said frame, a thresher pivotally mounted on the frame in coöperative relation with the reaper, a sacker's platform pivotally mounted on the body frame adjacent the thresher, and means for maintaining both the platform and the thresher level as the body frame tilts.

23. In a traveling harvester, the combination of a wheel-supported body frame, a thresher mounted thereon and provided with a movable discharge spout, a platform mounted on the body frame at one side of the thresher and having a sack-filling hopper into which the spout discharges, means for automatically maintaining the thresher level, automatically-operated means for leveling the platform and causing the same to rise and fall without tilting as the body frame tilts, and a reaping mechanism mounted on the said body frame in coöperative relation with the thresher.

24. In a traveling harvester, the combination of a reaper, a wheel-supported frame therefor, a thresher mounted thereon, and means for automatically continuously oscillating the thresher as a whole during the travel of the harvester.

25. In a traveling harvester, the combination of a supporting frame, a reaper thereon, a top heavy thresher pivotally connected to the frame to tilt transversely, and automatically-operated means for oscillating the thresher continuously during the travel of the harvester over level or undulating ground.

26. In a traveling harvester, the combination of a rigid body frame having a lateral extension, supporting wheels for the frame at the front end thereof and at the extension, a reaping mechanism on the said extension, a supplemental frame pivotally connected at its front and rear to the body frame, a supporting wheel rotatably mounted within the supplemental frame to rotate in a plane coincident with the points of pivotal connection between the frames, a separator mounted over both frames with its rear end rigidly secured to the supplemental frame and its front end pivotally secured to the body frame to tilt laterally, and a device actuated automatically by the relative tilting of the body frame and separator for holding the latter substantially level.

27. In a traveling harvester, the combination of a rigid body frame, a reaping mechanism mounted on the frame, front and side supporting wheels for the body frame, a supplemental frame, a single supporting wheel mounted within the supplemental frame, means for connecting the frames together for permitting relative tilting movement on an axis coincident with the line of draft and the plane of rotation of the last-mentioned wheel, a separator having its rear end rigidly secured to the supplemental frame, a pivotal connection between the front end of the separator and body frame, a device for maintaining the separator substantially level, and driving connections between the last-mentioned wheel and said means.

28. In an apparatus of the class described, the combination of a reaping mechanism, a body frame, a supplemental frame pivotally mounted therein, a separator mounted on the supplemental frame, the main frame extending beneath the separator, and a platform arranged alongside of the latter mounted on the portion of the main frame extending under the separator.

29. In an apparatus of the class described, the combination of a reaping mechanism, a body frame, a thresher disposed above the same, a supplemental frame disposed under the thresher, a pivotal connection between the frames located under the thresher, a single supporting wheel disposed in line with the said pivotal connection, a leveling device disposed above the thresher, means located in the plane of rotation of the said wheel for operatively connecting the device with the top of the thresher, and an automatically-operated mechanism for actuating said device.

30. In an apparatus of the class described, the combination of a reaping mechanism, a body frame, a thresher mounted thereon to tilt, a leveling means therefor, a platform supported on the body frame at one side of the thresher and adapted to move with the frame, and means for movably connecting the platform with the thresher to maintain the former level with the latter.

31. In an apparatus of the class described, the combination of a reaping mechanism, a body frame, a thresher mounted thereon to tilt, a leveling means therefor, a platform supported on the body frame at one side of the thresher and adapted to move with the frame, an upright connected with the platform, and a link connecting the upright with the thresher for maintaining the platform level with the thresher.

32. In a traveling harvester, the combination of a main body frame, a reaping mechanism carried thereby, a supplemental frame arranged within the body frame and pivotally connected thereto for relative tilting movement on an axis parallel with the line of draft, a fore-carriage for supporting the front end of the main frame, a rear supporting wheel arranged within the supplemental frame to rotate in a plane coincident with the pivotal connections between the frames, a side wheel mounted on the main frame, a separator having its rear end rigidly secured to the supplemental frame and extending forwardly therefrom, means for pivotally connecting the forward portion of the separator with the main frame, and a leveling device driven by the rear wheel and including means for maintaining the separator substantially level during transverse tilting of the main frame.

33. In a traveling harvester, the combination of a main body frame, a reaping mechanism carried thereby, a supplemental frame arranged within the body frame and pivotally connected thereto for relative tilting movement on an axis parallel with the line of draft, a fore-carriage for supporting the front end of the main frame, a rear supporting wheel arranged within the supplemental frame to rotate in a plane coincident with the pivotal connections between the frames, a side wheel mounted on the main frame, a separator having its rear end rigidly secured to the supplemental frame and extending forwardly therefrom, means for pivotally connecting the forward portion of the separator with the main frame, a leveling means mounted on the main frame and operatively connected with the separator, and driving connections between the said means and rear wheel and arranged partly on the supplemental frame and partly on the main frame to maintain the separator substantially level during the transverse tilting of the main frame.

34. In a traveling harvester, the combination of a main frame having spaced transverse beams, a supplemental frame disposed between the beams and pivotally connected at its front and rear ends to the beams, a supporting wheel arranged within the supplemental frame in the plane of the pivots of the same, wheels for supporting the main frame at the front and side, a reaping mechanism mounted on the main frame, a separator mounted partly on both frames to tilt laterally, a reversible screw extending across the separator, a nut operatively connected with the separator and engaging the screw, and a mechanism driven by the movement of the harvester and including means for turning the screw in either direction.

35. In a traveling harvester, the combination of pivotally connected frames, a reaping mechanism on one of the frames, a separator mounted partly on both frames, a screw extending across the top of the separator and longitudinally movable with respect thereto, a nut operatively connected with the separator and engaging the screw, and a mechanism for automatically rotating the screw in either direction to maintain the separator approximately level during the relative tilting of the frames.

36. In a traveling harvester, the combination of a body frame, a separator operatively connected therewith to tilt laterally, a screw disposed in parallelism with the body frame and extending transversely to the separator, means on the separator operatively connected with the screw for maintaining the separator approximately level by the rotation of the screw, and a mechanism for reversibly rotating the screw continuously during the travel of the harvester.

37. In a traveling harvester, the combination of a body frame, a separator mounted thereon to tilt laterally, a screw disposed in parallelism with the frame and extending across the top of the separator, means for operatively connecting the separator with the screw, a shaft connected with the screw at one end, separate driving means operating continuously during the travel of the harvester, and separate clutches automatically opened and closed by the relative tilting of the frame and separator to rotate the screw in either direction.

38. In a traveling harvester, the combination of a body frame, wheels supporting the same, a separator mounted on the frame to tilt laterally, a screw disposed transversely to the line of travel and extending across the separator to tilt in a vertical plane with the tilting of the body frame, means for operatively connecting the screw with the separator, separate means driven continuously during the travel of the harvester, and a device for operatively connecting the screw with either means.

In testimony that I claim the foregoing as my own I have hereto affixed my signature in the presence of two witnesses.

ALFRED HINES.

Witnesses:
 JOHN H. SIGGERS,
 DAVID R. WAGNER.

---

Copies of this patent may be obtained for five cents each, by addressing the "Commissioner of Patents, Washington, D. C."